United States Patent
Kare et al.

(10) Patent No.: US 12,086,173 B2
(45) Date of Patent: Sep. 10, 2024

(54) AUTOMATED PERSISTENCE OF LABEL INFORMATION ASSOCIATED WITH A DOCUMENT

(71) Applicant: Capital One Services, LLC, McLean, VA (US)

(72) Inventors: Sarvani Kare, Clarksville, MD (US); Yifan Guo, Katy, TX (US); Ada Musheyev, South Richmond Hill, NY (US); Ramachandra Kancharla, Glen Allen, VA (US); Venu Kumar Nannapaneni, Glen Allen, VA (US); Ganesh Kandula, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 18 days.

(21) Appl. No.: 18/164,173

(22) Filed: Feb. 3, 2023

(65) Prior Publication Data
US 2024/0265044 A1  Aug. 8, 2024

(51) Int. Cl.
*G06F 16/00* (2019.01)
*G06F 16/35* (2019.01)
*G06F 16/38* (2019.01)

(52) U.S. Cl.
CPC ............ *G06F 16/355* (2019.01); *G06F 16/38* (2019.01)

(58) Field of Classification Search
CPC ............................... G06F 16/355; G06F 16/38
See application file for complete search history.

(56) References Cited

U.S. PATENT DOCUMENTS

| | | | |
|---|---|---|---|
| 2008/0177782 A1* | 7/2008 | Poston | G06F 40/197 707/999.102 |
| 2013/0218835 A1* | 8/2013 | Greenspan | G06F 16/355 707/610 |
| 2019/0268379 A1* | 8/2019 | Narayanaswamy | H04L 63/0245 |
| 2020/0312432 A1* | 10/2020 | Wang | G06F 17/18 |

* cited by examiner

*Primary Examiner* — Jared M Bibbee
(74) *Attorney, Agent, or Firm* — Harrity & Harrity, LLP

(57) ABSTRACT

In some implementations, a labeling device may determine a label value associated with a label of the document that is associated with a first application. The labeling device may generate a label map that includes an indication of a key-value pair associated with the label value. The labeling device may write, based on the key-value pair associated with the label value, the label value to one or more file properties associated with the document, or may add, based on the key-value pair associated with the label value, the label value as content associated with the document. The label value may persist with the document based on transferring the document from the first application to a second application.

20 Claims, 7 Drawing Sheets

AUTOMATED PERSISTENCE OF LABEL INFORMATION ASSOCIATED WITH A DOCUMENT

BACKGROUND

Data loss prevention (DLP) techniques may be used to protect sensitive data. For example, DLP techniques may use metadata to classify sensitive data and/or to limit access to sensitive data. In some cases, metadata that exists in one context does not persist, or ceases to exist, when the metadata is moved to a different context. As an example, metadata associated with a document that classifies data within the document as sensitive data in a first computing environment does not persist, or ceases to exist, when the document is transferred to another computing environment (e.g., that is incompatible with the first computing environment).

SUMMARY

Some implementations described herein relate to a system for automated persistence of label information associated with a document across different applications. The system may include one or more memories and one or more processors communicatively coupled to the one or more memories. The one or more processors may be configured to obtain the label information associated with a label of the document in a first application, wherein the label information includes a label name and a label value. The one or more processors may be configured to generate a label map that includes an indication of, a first key-value pair associated with the label name, and a second key-value pair associated with the label value. The one or more processors may be configured to associate, based on the first key-value pair associated with the label name and the second key-value pair associated with the label value, the label name and the label value with the document, wherein the label name and the label value are persistent with the document based on transferring the document from the first application to a second application.

Some implementations described herein relate to a method for automated persistence of label information associated with a document across different applications. The method may include determining a label value associated with a label of the document, wherein the document is associated with a first application. The method may include generating a label map that includes an indication of a key-value pair associated with the label value. The method may include performing an action, the action including at least one of, writing, based on the key-value pair associated with the label value, the label value to one or more file properties associated with the document, or adding, based on the key-value pair associated with the label value, the label value as content associated with the document wherein the label value is persistent with the document based on transferring the document from the first application to a second application.

Some implementations described herein relate to a non-transitory computer-readable medium that stores a set of instructions. The set of instructions, when executed by one or more processors of a device, may cause the device to detect, in a first application, label metadata associated with a label of a document. The set of instructions, when executed by one or more processors of the device, may cause the device to identify, based on the label metadata, label information associated with the label of the document, wherein the label information indicates a label name, a label value, and one or more value options. The set of instructions, when executed by one or more processors of the device, may cause the device to generate, based on the label information, a label map, wherein the label map includes an indication of at least one of: a first key-value pair associated with the label name, a second key-value pair associated with the selected label value, or a third key-value pair associated with the one or more value options. The set of instructions, when executed by one or more processors of the device, may cause the device to associate, based on the label map, at least a portion of the label information with the document, wherein the at least a portion of the label information is persistent with the document based on transferring the document from the first application to a second application.

DETAILED DESCRIPTION

Figure 1A:
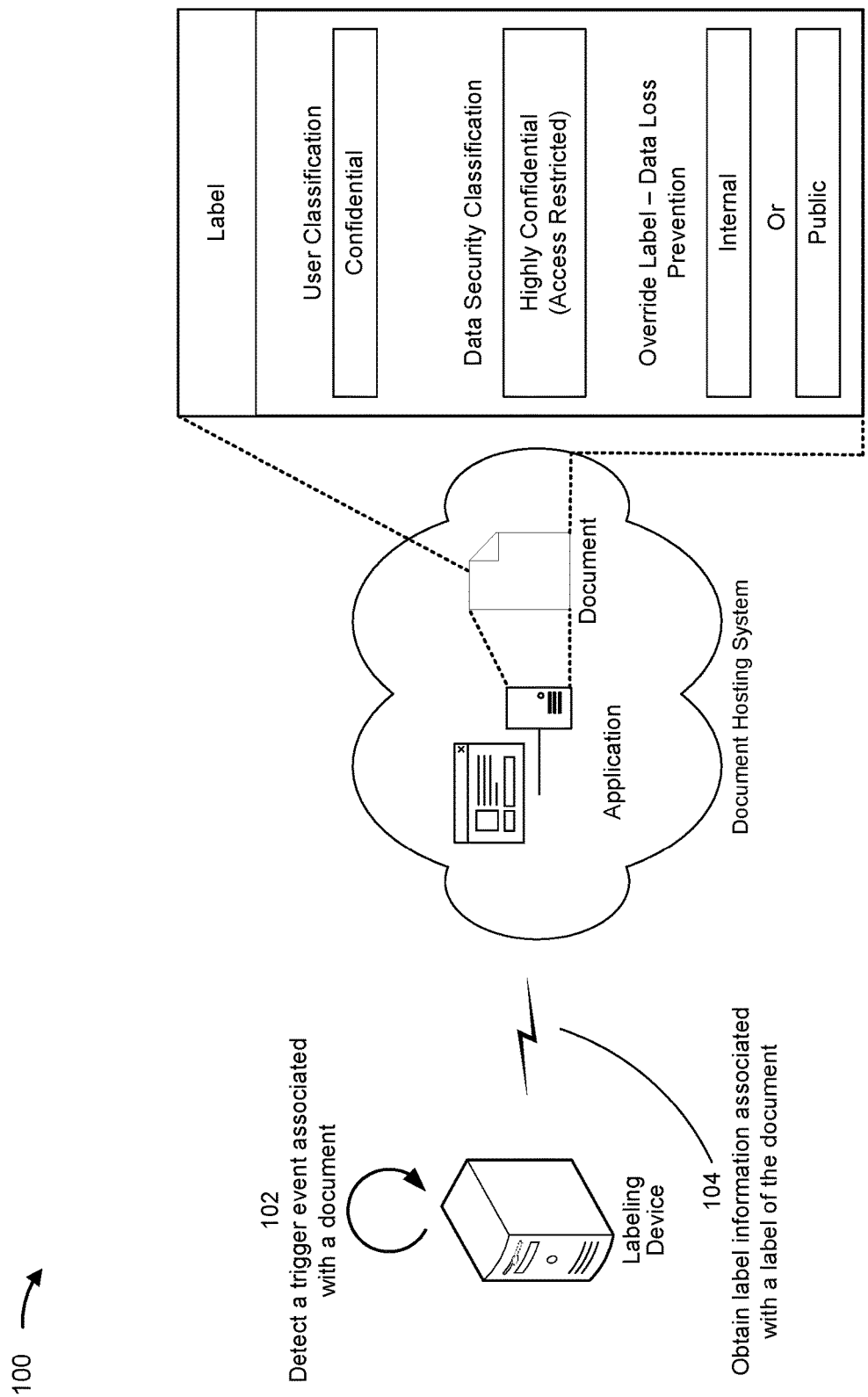
FIGS. 1A-1D are diagrams of an example associated with automated persistence of label information associated with a document, in accordance with some embodiments of the present disclosure.

The following detailed description of example implementations refers to the accompanying drawings. The same reference numbers in different drawings may identify the same or similar elements.

A data loss prevention (DLP) system may use DLP techniques to classify and/or protect data. A DLP policy may include rules, conditions, and/or actions associated with classifying and/or protecting the data. In some cases, the DLP system may associate a label with a rule, a condition, and/or an action associated with the DLP policy. For example, a DLP policy may grant access rights associated with a document to only a particular set of users, and the DLP system may apply the label to the document to enforce the DLP policy. In other words, because the label enforcing the DLP policy is applied to the document, the document is accessible only by the particular set of users granted access rights by the DLP policy.

In some cases, the DLP system may associate the label with the document by adding the label information as metadata to the document. However, the metadata typically does not persist in various contexts. For example, the metadata may not persist across incompatible products and/or services, across incompatible platforms (e.g., from Google Workspace to Proofpoint), and/or across incompatible applications (e.g., from Google Drive to Dropbox). Additionally, or alternatively, the metadata may not persist when being converted from a first file format to a second file format (e.g., from a .docx file format to a .pdf file format).

As an example, a document in a first platform may include a label, such as a label that indicates that data associated with the document is sensitive and that the document is associated with limited access rights, and the label may not persist to a second platform when the document is transferred across the first platform to the second platform (e.g., because the second platform is incompatible with the first platform). Because the document does not include the label in the second platform (e.g., the label ceases to exist after the document is transferred to the second platform), the DLP system would be unable to classify and/or protect the document (e.g., the DLP system cannot detect the sensitive data in the document and/or the DLP system cannot associate the document with the limited access rights). As a result, a malicious actor may obtain unauthorized access to the sensitive data and/or misuse the sensitive data.

Thus, the DLP system may consume resources (e.g., computing resources, networking resources, memory resources, and/or other resources) associated with the malicious actor obtaining unauthorized access to the sensitive data and/or misusing the sensitive data. For example, the DLP system may consume resources associated with determining whether the sensitive data is released for public viewing, generating notifications associated with the unauthorized access, and/or performing operations based on misuse of the sensitive data.

Some implementations described herein provide a system that obtains label information (e.g., label metadata) associated with a label of a document and associates (e.g., attaches, applies, and/or adds) the label information to the document using one or more techniques to enable the label information to persist across different products and/or services (e.g., across incompatible products and/or services), across different platforms (e.g., across incompatible platforms), across different applications (e.g., across incompatible applications), and/or across different file format conversions. As an example, the system may write the label information to one or more file properties associated with the document and/or may add the label information as content to the document, as described in more detail elsewhere herein.

In this way, the system may apply, based on the label information, the label to the document in various contexts. For example, if the document is transferred from a first platform to a second platform (e.g., that is incompatible with the first platform), then the system may apply, based on the label information, the label to the document in the second platform. For example, the labeling device may compose the label based on the label information that is written to the one or more file properties associated with the document and/or may compose the label based on the label information that is added as content associated with the document. As an example, the labeling device may apply the composed label to the document.

Because the label information persists with the document from the first application to the second application, the labeling device may apply the label to the document in the second application. As a result, the malicious actor may be prevented from obtaining unauthorized access, which reduces consumption of resources (e.g., by removing a need to determine whether sensitive data (e.g., obtained through unauthorized access) is released to the public, removing a need to generate notifications associated with the unauthorized access, and/or removing a need to perform operations based on misuse of the sensitive data).

FIGS. 1A-1D are diagrams of an example 100 associated with automated persistence of label information associated with a document. As shown in FIGS. 1A-1D, example 100 includes a labeling device and a document hosting system. These devices are described in more detail in connection with FIGS. 2 and 3.

As shown in FIG. 1A, and by reference number 102, the labeling device may detect a trigger event associated with a document. In some implementations, the document may be accessed in an application (e.g., executed by the document hosting system), and the labeling device may detect the trigger event based on determining that a file operation is performed (e.g., based on a user input provided to the application) on a file associated with the document. As an example, the file operation may be a create operation, a save operation, a save as operation, a copy operation, a rename operation, a delete operation, a share operation, an export operation, a repositioning operation, and/or a download operation performed on the file associated with the document.

For example, the labeling device may be communicably coupled to the document hosting system and/or the application, and the labeling device may detect the trigger event based on receiving an indication of file operation data associated with the file operation that is performed on the file associated with the document. In some implementations, the document hosting system and/or the application may store (e.g., in a storage device associated with the document hosting system and/or the application) the file operation data associated with the file.

As an example, the file operation data may include file operation types, file operation dates, and/or file operation timestamps, among other examples, associated with the file operation that is performed on the file associated with the document. In some implementations, the document hosting system and/or the application may transmit, and the labeling device may receive, the indication of the file operation data, and the labeling device may detect the trigger event based on the information included in the indication of the file operation data.

As shown by reference number 104, the labeling device may obtain label information associated with a label of the document. In some implementations, the label information associated with the label of the document may be applied to the document as metadata (e.g., label metadata). As an example, the metadata that is applied to the document may indicate one or more label names, one or more label values, and/or one or more value options associated with the label of the document.

In some implementations, the one or more label names, the one or more label values, and/or the one or more value options may be associated with a DLP policy. For example, the label name may be associated with a user classification category and the user classification category may include a confidential value option that indicates the text "Confidential", a proprietary value option that indicates the text "Proprietary", and/or a public value option that indicates the text "Public".

As an example, the label value may indicate the text "Confidential" in the document, such as in a header of the document, based on the confidential value option being selected (e.g., by a user input provided to the application). Thus, in some implementations, the label value may be a selected label value based on the selected value option.

In some implementations, the labeling device may obtain the label information associated with the label of the document based on detecting the trigger event associated with the document. For example, the labeling device may automatically run, based on detecting the trigger event, a script that determines whether the document is associated with a label. For example, the script may determine that the document is associated with the label based on identifying the label information (e.g., the label metadata) associated with the label of the document.

In some implementations, the script run by the labeling device may include an authorization protocol, such as an authorization protocol based on an authorization standard referred to as Open Authorization (OAuth). As an example, the script may include code associated with the authorization protocol to cause the application to perform the authorization protocol (e.g., based on executing the code associated with the authorization protocol) in response to detecting the trigger event associated with the document. In this way, the labeling device may obtain authorization to access the label information associated with the label of the document.

In some implementations, the labeling device may determine the one or more label names, the one or more label values, and/or the one or more value options associated with the label based on the label information associated with the document. For example, the labeling device may extract the metadata (e.g., associated with the label of the document) that is applied to the document and may use a text-analysis technique, such as a parsing technique, to identify the one or more label names, the one or more label values, and/or the one or more value options associated with the label of the document based on the metadata.

For example, if the metadata associated with the label of the document (e.g., applied to the document that is accessed in the application) indicates a label name of "User Selected Data Classification," a selected label value of "Confidential," and value options of "Top Secret," "Internal," "Public," and "Private," then the labeling device may determine that the label name is "User Selected Data Classification," that the selected label value is "Confidential," and that the value options are "Confidential," "Top Secret," "Internal," "Public," and "Private."

Additionally, or alternatively, the labeling device may receive, and the document hosting system and/or the application may transmit, an indication of the label information (e.g., the metadata associated with the label of the document).

As an example, the document hosting system and/or the application may obtain the label information and determine the one or more label names, the one or more label values, and/or the one or more value options. For example, the document hosting system and/or the application may scan the document to obtain the metadata (e.g., applied to the document and associated with the label of the document). The document hosting system and/or the application may parse the metadata to determine the one or more label names, the one or more label values, and/or the one or more value options. As an example, the document hosting system and/or the application may include the one or more label values, the one or more label names, and/or the one or more value options in the indication of the label information and transmit the indication to the labeling device.

As shown in FIG. 1A, the label information may indicate a first label name (e.g., shown as "User Classification" in FIG. 1A) that is associated with a first selected label value (e.g., shown as "Confidential" in FIG. 1A), a second label name (e.g., shown as "Data Security Classification" in FIG. 1A) that is associated with a second selected label value (e.g., shown as "Highly Confidential (Access Restricted)" in FIG. 1A), and/or a third label name (e.g., shown as "Override Label—Data Loss Prevention" in FIG. 1) that is associated with a third selected label value that can be selected from a first value option (e.g., shown as "Internal" in FIG. 1A) and a second value option (e.g., shown as "Public" in FIG. 1A).

In some implementations, the labeling device may generate a label map based on the obtaining the label information associated with the label of the document. For example, the labeling device may generate key-value pairs based on the label information associated with the label of the document. In some implementations, the labeling device may group the key-value pairs based on the one or more label names and/or the one or more label values being associated with one another. For example, if the label name is associated with the label value, then the labeling device may associate a label identifier with a key of the key-value pair associated with the label name and a key of the key-value pair associated with the label value to group the key-value pair associated with the label name with the key-value pair associated with the label value.

As an example, the labeling device may generate, based on the label information indicated in the label of the document in FIG. 1A, a first key-value pair associated with the first label name (e.g., "User Classification"), a second key-value pair associated with the first label value (e.g., "Confidential"), a third key-value pair associated with the second label name (e.g., "Data Security Classification"), a fourth key-value pair associated with the second label value (e.g., "Highly Confidential (Access Restricted)"), a fifth key-value pair associated with the third label name (e.g., "Override Label—Data Loss Prevention"), and/or a sixth key-value pair associated with the third label value (e.g., "Internal" or "Public").

For example, the labeling device may associate a first label identifier to the first key-value pair and the second key pair value, a second label identifier to the third key-value pair and the fourth key-value pair, and a third label identifier associated with the fifth key-value pair and the sixth key-value pair. In this way, the labeling device may use the label identifier to identify a label name and a label value that are associated with one another. In other words, for example, the labeling device may use the label identifier to group key-value pairs that are associated with one another.

As an example, the labeling device may include a first label identifier (e.g., "11111") in the key of the first key-value pair (e.g., "LabelName=11111: User Classification") and in the key of the second key-value pair (e.g., "LabelValue=11111: Confidential") to group the first key-value pair with the second key-value pair. The labeling device may include a second label identifier (e.g., "22222") in the key of the third key-value pair (e.g., "LabelName=22222: Data Security Classification") and in the key of the fourth key-value pair (e.g., "Label Value=22222: Highly Confidential") to group the third key-value pair with the fourth key-value pair. The labeling device may include a third label identifier (e.g., "33333") in the key of the fifth key-value pair (e.g., "LabelName=33333: User Override Label—Data Loss Prevention") and in the key of the sixth key-value pair (e.g., "LabelValue=33333: Internal or Public") to group the fifth key-value pair with the sixth key-value pair.

The label identifier indicated as "11111," the label identifier indicated as "22222," the label identifier indicated as "33333," the key-value pair indicated as "LabelName=11111: User Classification," the key-value pair indicated as "LabelValue=11111: Confidential," the key-value pair indicated as "LabelName=22222: Data Security Classification", the key-value pair indicated as "LabelValue=22222: Highly Confidential," the key-value pair indicated as "LabelName=33333: User Override Label—Data Loss Prevention," and the key-value pair indicted as "LabelValue=33333: Internal or Public' are merely examples, and the labeling device may use other label identifiers and/or key-value pairs.

Figure 1B:
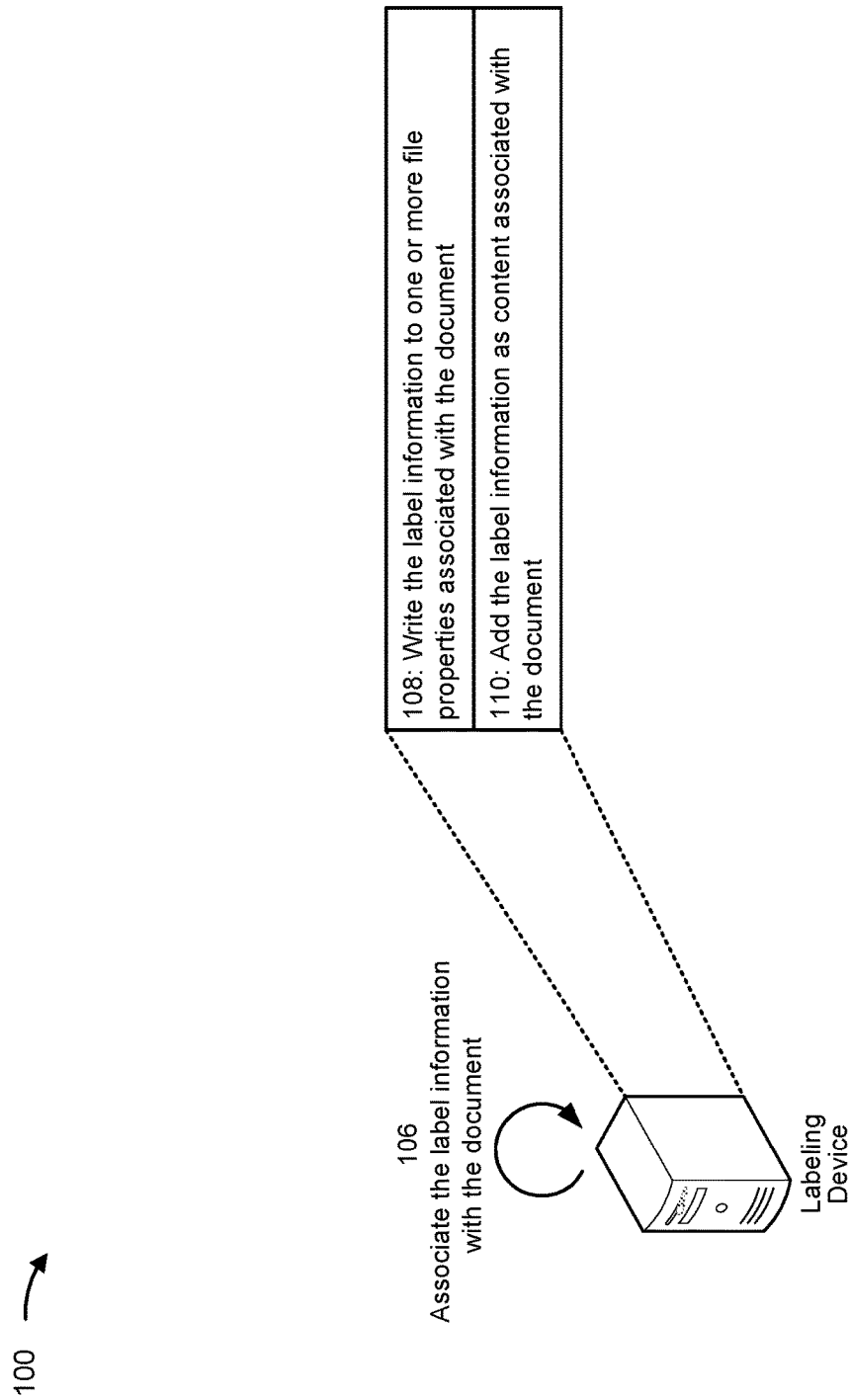
Figure 1C:
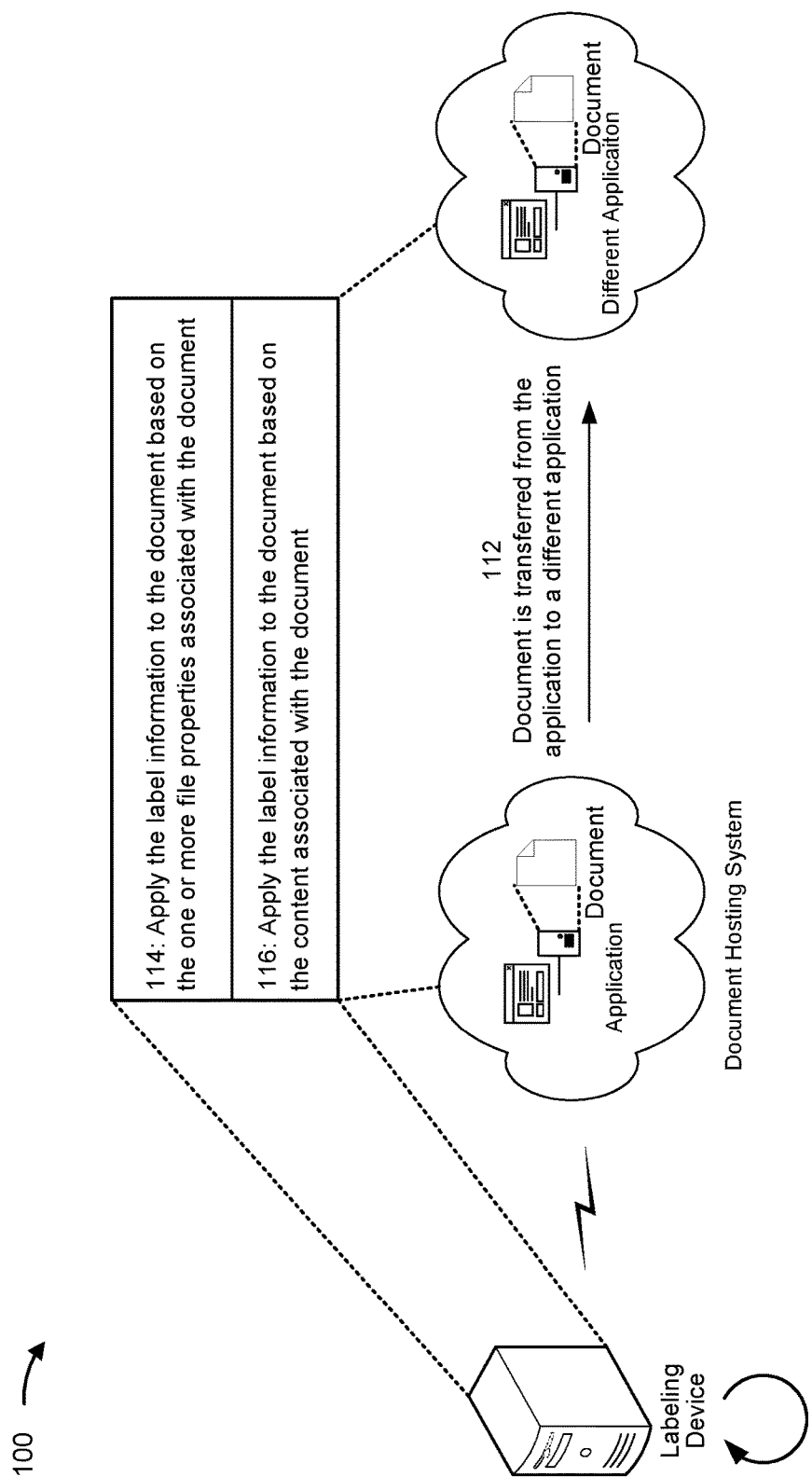

As shown in FIG. 1B, and by reference number 106, the labeling device may associate the label information with the document. For example, the labeling device may associate the label information with the document using one or more techniques or a combination of multiple techniques to enable the label information to persist across products and/or services (e.g., across incompatible products and/or services), across platforms (e.g., across incompatible platforms), across applications (e.g., across incompatible applications), and/or across file format conversions. As an example, the labeling device may associate the label information with the document based on the information associated with the label map (e.g., based on the key-value pairs associated with the label map).

As shown by reference number 108, the labeling device may write the label information to one or more file properties associated with the document. For example, the labeling device may write the information associated with the label of the document (e.g., the information indicated in one or more key-value pairs associated with the label map), to the one or more file properties associated with the document.

As an example, the one or more file properties associated with the document may be based on a file format and/or a file extension of the document. For example, one or more properties associated with the document may be based on a Microsoft Word Document file format (e.g., associated with a .doc file extension and/or a .docx file extension), a Portable Document Format (PDF) file format (e.g., associated with a .pdf file extension), an OpenDocument Text Document file format (e.g., associated with a .odt file extension), a HyperTextMarkup (HTM) file format (e.g., associated with a .htm extension), a HyperTextMarkup Language (HTML) file format (e.g., associated with a .html extension), an Extensible Markup Language (XML)-based file format (e.g., associated with a .xlsx file extension and/or a .xlsm file extension), a web archive file format (e.g. associated with a mhtml and/or a .mht file extension), an XML Paper Specification file format (e.g., associated with a .xps file extension), a comma-separated values (CSV)-based file format (e.g., associated with a .csv file extension), a plain text file format (e.g., associated with a .txt file extension), and/or a Rich Text Format (e.g., associated with a .rtf file extension), among other examples.

As another example, the one or more file properties associated with the document may be based on a proprietary file format associated with a proprietary product and/or a proprietary service (e.g., associated with a proprietary file extension associated with the proprietary product and/or the proprietary service), a proprietary file format associated with a proprietary platform (e.g., associated with a proprietary file extension associated with proprietary platform), and/or a proprietary file format associated with a proprietary application (e.g., associated with a proprietary file extension associated with the proprietary application), among other examples.

In some implementations, the one or more file properties associated with the document may include a file type property, a file size property, a file location property, a last modified property, a created property, a file metadata property, a file tag property, a comments property, a template property, a file status property, a categories property, a subject property, a company property, a word amount property, a printed property, an author property, a related documents property, and/or a configurable parameter property.

As an example, if the one or more file properties associated with the document are based on an XML file format (e.g., an Excel spreadsheet associated with a .xlsx file extension), then the labeling device may write the label information associated with the label shown in FIG. 1A to a named range in the document. For example, the labeling device may write, to the named range in the document, the first key-value pair (e.g., "LabelName=11111: User Classification"), the second key-value pair (e.g., "LabelValue=11111: Confidential"), the third key-value pair (e.g., "LabelName=22222: Data Security Classification") the fourth key-value pair (e.g., "Label Value=22222: Highly Confidential"), the fifth key-value pair (e.g., "LabelName=33333: User Override Label—Data Loss Prevention"), and/or the sixth key-value pair (e.g., "LabelValue=33333: Internal or Public") to the one or more file properties associated with the document.

Additionally, or alternatively, the labeling device may write the label information to one or more other file properties associated with the document (e.g., the document based on the XML file format), such as the comments file property, the tag file property, and/or the configurable parameter property, among other examples. In this way, the label information persists with the document when the document is transferred from one application to another application. Thus, in some implementations, the labeling device may compose the label based on the label information that is written to the one or more file properties associated with the document and may apply the composed label to the document in the second application.

As shown by reference number 110, the labeling device may add the label information as content associated with the document. For example, the labeling device may add the label information associated with the label of the document to a header of the document, to a footer of the document, and/or to a body of the document. As another example, the labeling device may embed the label information associated with the label of the document within the document.

As an example, if the one or more file properties associated with the document are based on a Microsoft Word Document file format (e.g., associated with the .docx file extension), then the labeling device may add the label information associated with the label shown in FIG. 1A as content associated with the document. For example, the labeling device may add, to the header of the document, the first key-value pair (e.g., "LabelName=11111: User Classification"), the second key-value pair (e.g., "LabelValue=11111: Confidential"), the third key-value pair (e.g., "LabelName=22222: Data Security Classification"), the fourth key-value pair (e.g., "Label Value=22222: Highly Confidential"), the fifth key-value pair (e.g., "LabelName=33333: User Override Label—Data Loss Prevention"), and/or the sixth key-value pair (e.g., "LabelValue=33333: Internal or Public"). In this way, the label information persists with the document when the document is transferred from one application to another application. Thus, in some implementations, the labeling device may compose the label based on the label information that is added as content associated with the document and may apply the composed label to the document in the second application.

As shown by reference number 112, the document may be transferred from the application to a different (e.g., second) application. For example, the user of the application may provide a user input to the application that causes the application to download the document from the application to the different application (e.g., an incompatible application), and the label associated with the document in the first application (e.g., shown in FIG. 1A) does not persist to the different application. In other words, the document does not include a label in the different application based on transferring the document from the application to the different application.

As shown by reference number 114, the labeling device may apply the label information to the document based on the one or more file properties associated with the document. As an example, the labeling device may generate a new label based on writing the label information associated with the label of the document to the one or more file properties associated with the document (e.g., the components of the label information may be composed to form the label).

For example, if the label information associated with the label shown in FIG. 1A is stored in the one or more file properties associated with the document, then the labeling device may generate the new label to match the label as shown in FIG. 1A. As an example, the labeling device may generate the User Classification label name based on the first key-value pair (e.g., "LabelName=11111: User Classification"), the Confidential label value based on the second key-value pair (e.g., "LabelValue=11111: Confidential"), the Data Security Classification label name based on the third key-value pair (e.g., "LabelName=22222: Data Security Classification"), the Highly Confidential (Access Restricted) label value based on the fourth key-value pair (e.g., "LabelValue=22222: Highly Confidential"), the Override Label—Data Loss Prevention label name based on the fifth key-value pair (e.g., "LabelName=33333: User Override Label—Data Loss Prevention"), and/or the Internal and Public value options based on the sixth key-value pair. In this way, the label identifier (e.g., "11111," "22222," and/or "33333") may be used to group the label names that correspond to the label values.

As shown by reference number 116, the labeling device may apply the label information to the document based on the content associated with the document. As an example, the labeling device may generate a new label based on adding the label information associated with the label of the document as content associated with the document in a similar manner described in connection with reference number 116 and/or in more detail elsewhere herein. In some implementations, the label identifier (e.g., "11111," "22222," and/or "33333") may be used to distinguish the label information from other content associated with the document.

In some implementations, the labeling device may convert the document from a first file format to a second file format and apply the label value to the document in the second file format. In some implementations, the labeling device may determine whether the label information is modified based on detecting the trigger event. As an example, the labeling device may generate modified label information based on determining that the label information is modified. As an example, the labeling device may apply the modified label information to the document (e.g., in the different application and/or after converting the document from the first file format to the second file format).

Figure 1D:
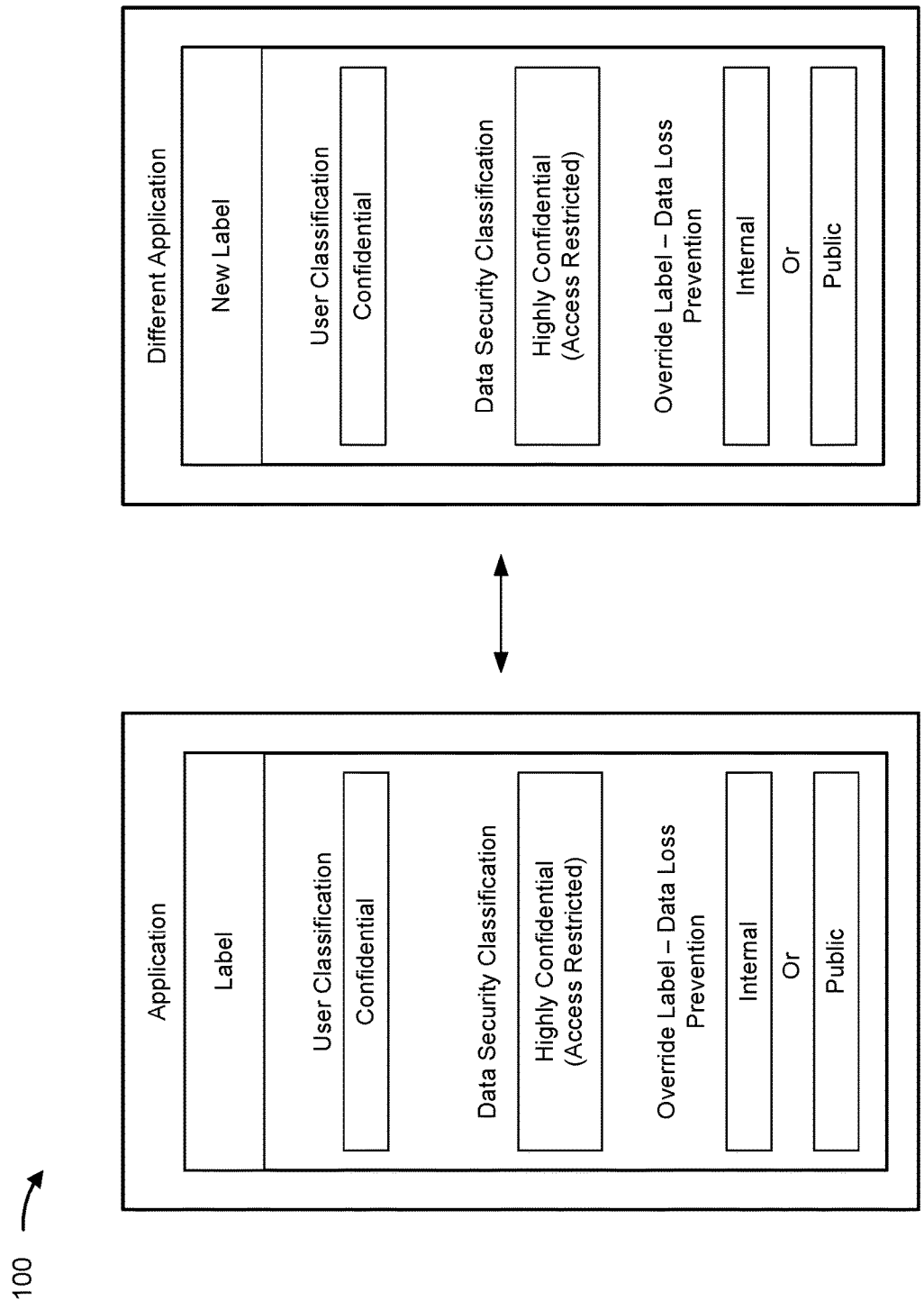

As shown in FIG. 1D, the label information associated with the document in the application and the label information associated with the document in the different application include the same information. In this way, the system may apply, based on the label information, the label to the document in various contexts. For example, if the document is transferred from a first platform to a second platform (e.g., that is incompatible with the first platform), then the system may apply, based on the label information, the label to the document in the second platform. For example, the labeling device may compose the label based on the label information that is written to the one or more file properties associated with the document and/or may compose the label based on the label information that is added as content associated with the document. As an example, the labeling device may apply the composed label to the document.

Because the label information persists with the document from the first application to the second application, the labeling device may apply the label to the document in the second application. As a result, the malicious actor may be prevented from obtaining unauthorized access, which reduces consumption of resources (e.g., by removing a need to determine whether sensitive data (e.g., obtained through unauthorized access) is released to the public, removing a need to generate notifications associated with the unauthorized access, and/or removing a need to perform operations based on misuse of the sensitive data).

As indicated above, FIGS. 1A-1D are provided as an example. Other examples may differ from what is described with regard to FIGS. 1A-1D.

Figure 2:
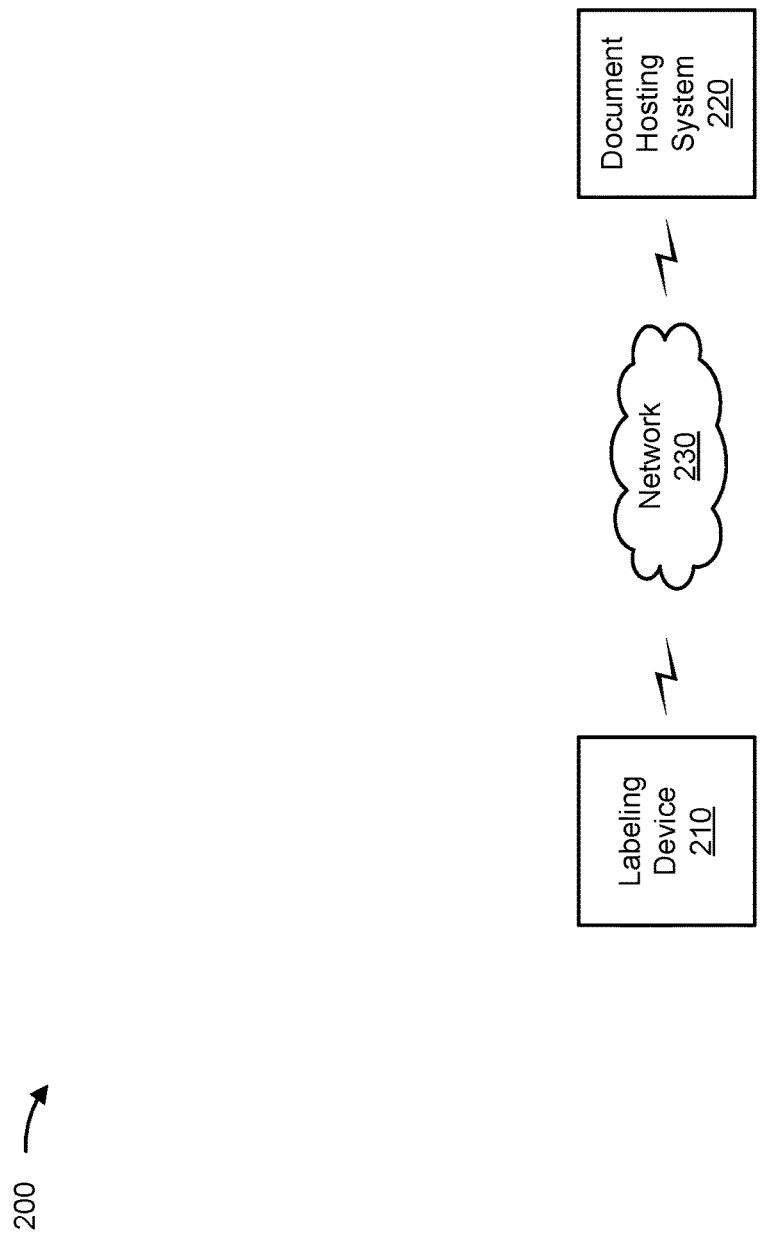
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a labeling device 210, a document hosting system 220, and/or a network 230. Devices of environment 200 may interconnect via wired connections, wireless connections, or a combination of wired and wireless connections.

The labeling device 210 may include one or more devices capable of receiving, generating, storing, processing, providing, and/or routing information associated with automated persistence of label information associated with a document, as described elsewhere herein. The labeling device 210 may include a communication device and/or a computing device. For example, the labeling device 210 may include a server, such as an application server, a client server, a web server, a database server, a host server, a proxy server, a virtual server (e.g., executing on computing hardware), or a server in a cloud computing system. In some implementations, the labeling device 210 may include computing hardware used in a cloud computing environment.

The document hosting system 220 may include one or more devices capable of receiving, generating, storing, processing, providing, and/or routing information associated with automated persistence of label information associated with a document, as described elsewhere herein. The document hosting system 220 may include a communication device and/or a computing device. For example, the document hosting system 220 may include a server, such as an application server, a client server, a web server, a database server, a host server, a proxy server, a virtual server (e.g., executing on computing hardware), or a server in a cloud computing system. In some implementations, the document hosting system 220 may include computing hardware used in a cloud computing environment.

The network 230 may include one or more wired and/or wireless networks. For example, the network 230 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 230 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
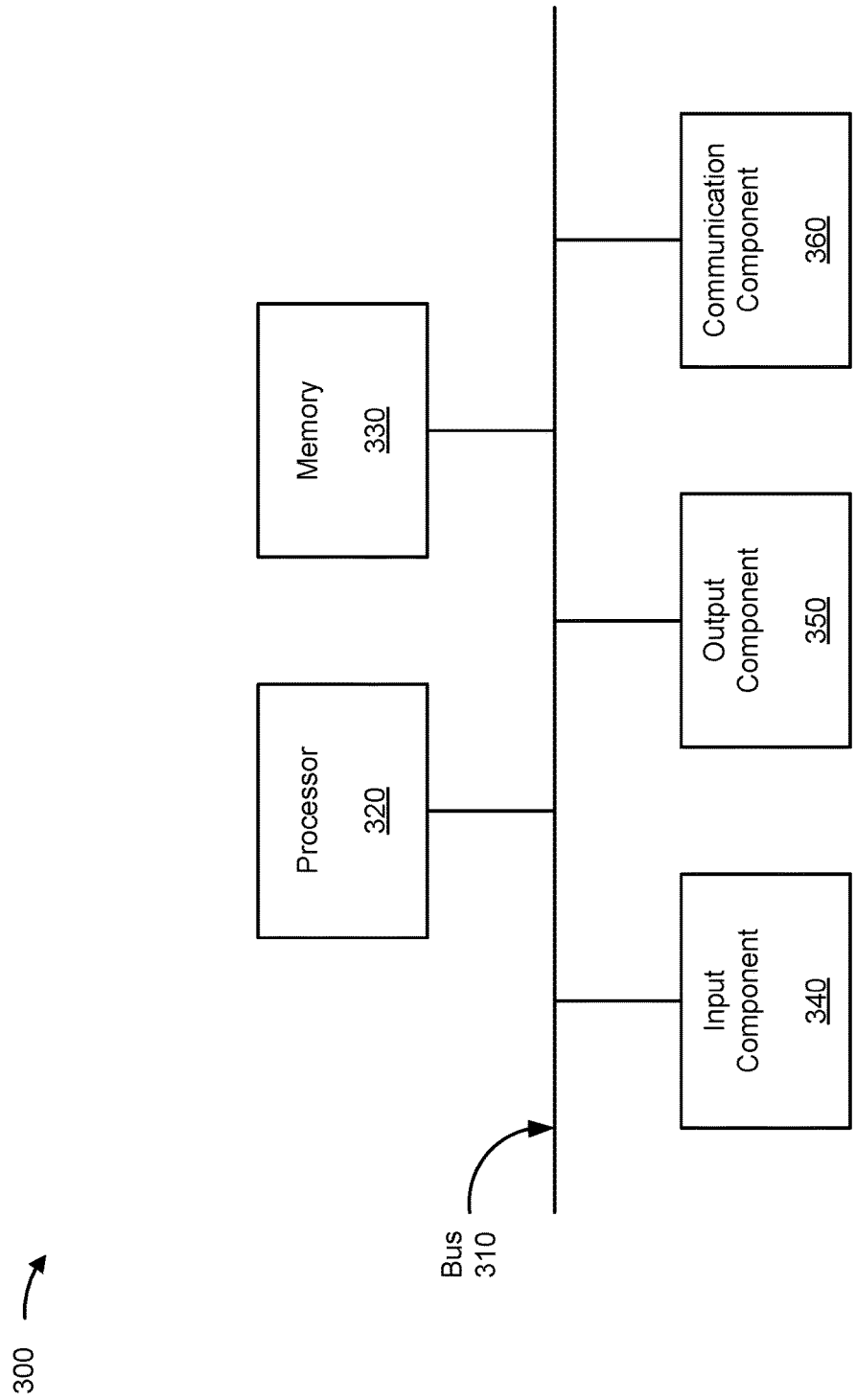
FIG. 3 is a diagram of example components of a device associated with automated persistence of label information associated with a document, in accordance with some embodiments of the present disclosure.

FIG. 3 is a diagram of example components of a device 300 associated with automated persistence of label information associated with a document. The device 300 may correspond to the labeling device and/or the document hosting system. In some implementations, the labeling device and/or the document hosting system may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
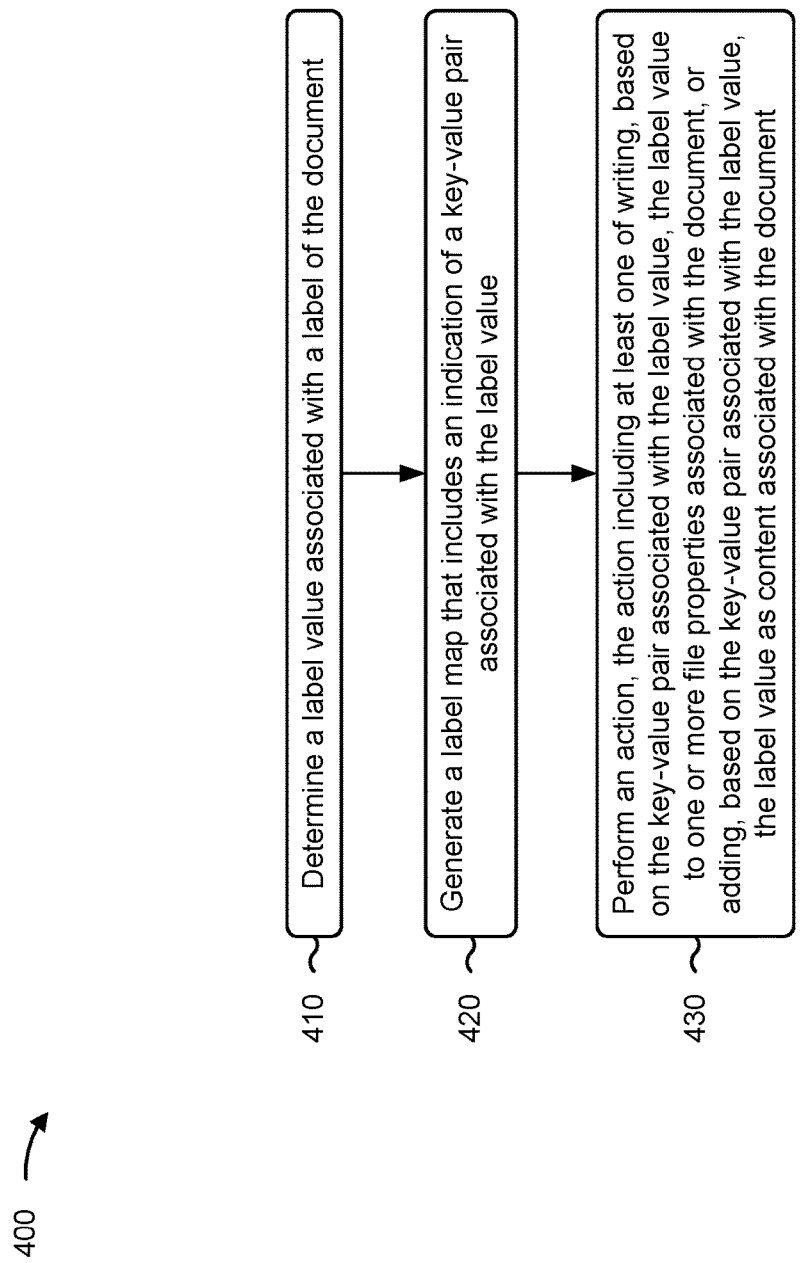
FIG. 4 is a flowchart of an example process associated with automated persistence of label information associated with a document, in accordance with some embodiments of the present disclosure.

FIG. 4 is a flowchart of an example process 400 associated with automated persistence of label information associated with a document. In some implementations, one or more process blocks of FIG. 4 may be performed by the labeling device 210. In some implementations, one or more process blocks of FIG. 4 may be performed by another device or a group of devices separate from or including the labeling device 210, such as the document hosting system 220. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include determining a label value associated with a label of the document (block 410). In some implementations, the document may be associated with the application (e.g., a first application). For example, the labeling device 210 (e.g., using processor 320 and/or memory 330) may determine a label value associated with a label of the document, wherein the document is associated with a first application, as described above in connection with reference number 104 of FIG. 1A. As an example, the labeling device may determine a label value based on identifying label information associated with the document. For example, the labeling device may extract metadata (e.g., associated with a label of the document) that is applied to the document and may use a text-analysis technique, such as a parsing technique, to identify the label value associated with the label of the document based on the metadata.

As further shown in FIG. 4, process 400 may include generating a label map that includes an indication of a key-value pair associated with the label value (block 420). For example, the labeling device 210 (e.g., using processor 320 and/or memory 330) may generate a label map that includes an indication of a key-value pair associated with the label value, as described above in connection with FIG. 1A. As an example, the labeling device may generate a label map based on the obtaining the label information associated with the label of the document. For example, the labeling device may generate a key-value pair associated with the label value (e.g., the second a second key-value pair associated with the first label value (e.g., "Confidential") as described in more detail elsewhere herein).

As further shown in FIG. 4, process 400 may include performing an action, the action including at least one of: writing, based on the key-value pair associated with the label value, the label value to one or more file properties associated with the document, or adding, based on the key-value pair associated with the label value, the label value as content associated with the document (block 430). In some implementations, the label value may be persistent with the document based on transferring the document from the first application to a second application For example, the labeling device 210 (e.g., using processor 320 and/or memory 330) may perform an action, the action including at least one of: writing, based on the key-value pair associated with the label value, the label value to one or more file properties associated with the document, or adding, based on the key-value pair associated with the label value, the label value as content associated with the document, as described above in connection with reference numbers 108 and 110 of FIG. 1B. As an example, the labeling device may write the information associated with the label of the document (e.g., the information indicated in one or more key-value pairs associated with the label map), to the one or more file properties associated with the document. As another example, the labeling device may add the label information associated with the label of the document to a header of the document, to a footer of the document, and/or to a body of the document.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 2 and 3. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for automated persistence of label information associated with a document across different applications, the system comprising:
   one or more memories; and
   one or more processors, communicatively coupled to the one or more memories, configured to:
      obtain the label information associated with a label of the document in a first application;
         wherein the label information includes a label name and a label value;
      generate a label map that includes an indication of:

a first key-value pair associated with the label name, and a second key-value pair associated with the label value; and associate, based on the first key-value pair associated with the label name and the second key-value pair associated with the label value, the label name and the label value with the document, wherein the label name and the label value are persistent with the document based on transferring the document from the first application to a second application.

2. The system of claim 1, wherein the one or more processors are further configured to:

apply, based on the label value and the label name, the label to the document in the second application.

3. The system of claim 1, wherein the one or more processors are further configured to:

detect a trigger event associated with the document; and obtain the label information associated with the label of the document based on the trigger event.

4. The system of claim 3, wherein the one or more processors, to obtain the label information associated with the label of the document, are configured to:

automatically run, based on the trigger event, a script to obtain the label information associated with the document.

5. The system of claim 1, wherein the one or more processors, to associate the label name and the label value with the document, are configured to:

write the label name and the label value to one or more file properties associated with the document.

6. The system of claim 1, wherein the one or more processors, to associate the label name and the label value with the document, are configured to:

add the label name and the label value as content associated with the document.

7. The system of claim 1, wherein the label of the document is associated with a first file format in the first application, and wherein the label of the document is associated with a second file format in the second application that is not compatible with the first file format.

8. A method for automated persistence of label information associated with a document across different applications, comprising:

determining a label value associated with a label of the document, wherein the document is associated with a first application;

generating a label map that includes an indication of a key-value pair associated with the label value; and performing an action, the action including at least one of:

writing, based on the key-value pair associated with the label value, the label value to one or more file properties associated with the document, or adding, based on the key-value pair associated with the label value, the label value as content associated with the document; and wherein the label value is persistent with the document based on transferring the document from the first application to a second application.

9. The method of claim 8, further comprising:

applying, based on the label value, the label to the document in the second application.

10. The method of claim 9, wherein the label value is associated with a first file format in the first application, and wherein applying, based on the label value, the label to the document in the second application comprises:

applying the label value to the document in the second application in a second file format that is incompatible with the first file format.

11. The method of claim 8, further comprising;

obtaining a label name associated with the label of the document; and associating the label name with the document, wherein the label name is persistent with the document based on transferring the document from the first application to the second application.

12. The method of claim 11, further comprising:

applying the label name to the document in the second application.

13. The method of claim 8, further comprising;

determining one or more value options associated with the label value; and associating the one or more value options with the document, wherein the one or more value options are persistent with the document based on transferring the document from the first application to the second application.

14. The method of claim 8, wherein the document is associated with a first file format, and wherein the method further comprises:

converting the document to a second file format; and applying the label value to the document in the second file format.

15. The method of claim 8, further comprising:

detecting a trigger event associated with the document; and obtaining the label value associated with the label of the document based on detecting the trigger event.

16. A non-transitory computer-readable medium storing a set of instructions, the set of instructions comprising:

one or more instructions that, when executed by one or more processors of a device, cause the device to:

detect, in a first application, label metadata associated with a label of a document;

identify, based on the label metadata, label information associated with the label of the document, wherein the label information indicates a label name, a label value, and one or more value options;

generate, based on the label information, a label map, wherein the label map includes an indication of at least one of:

a first key-value pair associated with the label name, a second key-value pair associated with the label value, or a third key-value pair associated with the one or more value options; and associate, based on the label map, at least one portion of the label information with the document, wherein the at least one portion of the label information is persistent with the document based on transferring the document from the first application to a second application.

17. The non-transitory computer-readable medium of claim 16, wherein the one or more instructions, when executed by the one or more processors, further cause the device to:

apply the label information to the document in the second application.

18. The non-transitory computer-readable medium of claim 17, wherein the label information is associated with a first file format in the first application, and
wherein the label information is associated with a second file format in the second application that is not compatible with the first file format.

19. The non-transitory computer-readable medium of claim 16, wherein the one or more instructions, when executed by the one or more processors, further cause the device to:
detect a trigger event associated with the document;
determine whether the label information is modified based on detecting the trigger event; and
generate modified label information based on determining that the label information is modified.

20. The non-transitory computer-readable medium of claim 19, wherein the one or more instructions, when executed by the one or more processors, further cause the device to:
associate the modified label information with the document,
wherein the modified label information is persistent with the document based on transferring the document from the first application to the second application.

* * * * *